United States Patent
Hsu et al.

(10) Patent No.: US 9,223,347 B2
(45) Date of Patent: Dec. 29, 2015

(54) DISPLAY PANEL DEVICE

(71) Applicant: Quanta Computer Inc., Taoyuan Shien (TW)

(72) Inventors: Chih-Kai Hsu, Taotuan Shien (TW); I-Hao Chen, New Taipei (TW); Kun-Ho Lee, New Taipei (TW); Li-Chuan Liu, Taoyuan Shien (TW); Yin-Wei Yeh, New Taipei (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 159 days.

(21) Appl. No.: 14/070,414

(22) Filed: Nov. 1, 2013

(65) Prior Publication Data

US 2014/0321041 A1 Oct. 30, 2014

(30) Foreign Application Priority Data

Apr. 24, 2013 (TW) .............................. 102207479 U (51) Int. Cl.
*G06F 1/16* (2006.01)

(52) U.S. Cl.
CPC ............ *G06F 1/1637* (2013.01); *G06F 1/1626* (2013.01); *G06F 1/1656* (2013.01)

(58) Field of Classification Search
None
See application file for complete search history.

(56) References Cited

U.S. PATENT DOCUMENTS

| | | | | |
|---|---|---|---|---|
| 5,682,182 A * | 10/1997 | Tsubosaka | ..................... | 345/173 |
| 5,732,928 A * | 3/1998 | Chang | ............................ | 248/688 |
| 5,823,504 A * | 10/1998 | Kuwajima | ..................... | 248/685 |
| 6,284,407 B1 * | 9/2001 | Murray et al. | ................ | 429/186 |
| 6,807,050 B1 * | 10/2004 | Whitehorn et al. | ....... | 361/679.23 |
| 6,822,857 B2 * | 11/2004 | Jung et al. | ................ | 361/679.02 |
| 7,001,088 B2 * | 2/2006 | Hui-hu | ........................... | 400/681 |
| 7,415,108 B2 * | 8/2008 | Toh | ................ | 379/445 |
| 7,618,017 B2 * | 11/2009 | Mamizuka | ............. | F16M 13/02 |
| | | | | 235/383 |
| 7,934,689 B2 * | 5/2011 | Chiu et al. | ................ | 248/222.11 |
| 8,023,256 B2 * | 9/2011 | Walker et al. | ............ | 361/679.27 |
| 8,081,261 B2 * | 12/2011 | Honda et al. | ................... | 348/836 |
| 8,360,382 B2 * | 1/2013 | Wu et al. | ........................ | 248/371 |
| 8,382,059 B2 * | 2/2013 | Le Gette et al. | .............. | 248/460 |
| 8,605,433 B2 * | 12/2013 | Chiang et al. | ............ | 361/679.59 |
| 8,614,888 B2 * | 12/2013 | Sakata et al. | ............. | 361/679.59 |
| 8,763,974 B2 * | 7/2014 | Hsu | ................ | 248/371 |
| 9,013,865 B2 * | 4/2015 | Chen et al. | ............... | 361/679.21 |
| 2005/0057896 A1 * | 3/2005 | Homer | ........................... | 361/686 |
| 2005/0105257 A1 * | 5/2005 | Shimizu et al. | ............... | 361/681 |
| 2005/0121594 A1 * | 6/2005 | Kuo | ............................. | 248/676 |
| 2006/0077623 A1 * | 4/2006 | Yeh | ................ | 361/681 |
| 2006/0113382 A1 * | 6/2006 | Singgih | ................ | F16M 13/005 |
| | | | | 235/383 |
| 2006/0219856 A1 * | 10/2006 | Oh | ........................ | F16M 11/10 |
| | | | | 248/274.1 |
| 2007/0014082 A1 * | 1/2007 | Wang et al. | .................... | 361/681 |
| 2007/0109734 A1 * | 5/2007 | Chen et al. | .................... | 361/681 |

(Continued)

*Primary Examiner* — Hoa C Nguyen
*Assistant Examiner* — Xanthia C Cunningham
(74) *Attorney, Agent, or Firm* — Sawyer Law Group, P.C.

(57) ABSTRACT

A display panel device includes a panel, a stand, at least one stand hinge, and at least one foot mechanism. The stand hinge is disposed at a first side of the stand, and the stand hinge is pivotally connecting the panel to the stand. The foot mechanism is disposed at a second side of the stand opposite to the first side. The foot mechanism includes a foot and an elastically pivot assembly. The elastically pivot assembly is pivotally connecting the foot to the stand. When the panel display device is in an opened status, the panel and the stand form a first angle, and one side of the foot lies on a plane. When the panel display device is in a closed status, the stand covers the panel and the foot mechanism is placed within an opening of the panel.

9 Claims, 7 Drawing Sheets

(56) References Cited

U.S. PATENT DOCUMENTS

| | | | |
|---|---|---|---|
| 2007/0121280 A1* | 5/2007 | Yang | 361/681 |
| 2007/0217135 A1* | 9/2007 | Chuang et al. | 361/681 |
| 2008/0062624 A1* | 3/2008 | Regen et al. | 361/680 |
| 2008/0251659 A1* | 10/2008 | Matias | 248/166 |
| 2011/0134588 A1* | 6/2011 | Barnett | 361/679.01 |
| 2011/0222233 A1* | 9/2011 | Lu et al. | 361/679.21 |
| 2011/0286171 A1* | 11/2011 | Franz et al. | 361/679.21 |
| 2012/0170215 A1* | 7/2012 | Fan et al. | 361/679.59 |
| 2012/0262853 A1* | 10/2012 | Sung | 361/679.01 |
| 2012/0281343 A1* | 11/2012 | Cheng et al. | 361/679.01 |
| 2013/0163197 A1* | 6/2013 | Mack et al. | 361/679.56 |
| 2013/0299663 A1* | 11/2013 | Pan et al. | 248/371 |

* cited by examiner

DISPLAY PANEL DEVICE

CROSS-REFERENCE TO RELATED APPLICATIONS

This application claims priority to Taiwan Application Serial Number 102207479, filed Apr. 24, 2013, which is herein incorporated by reference.

FIELD OF THE INVENTION

The present disclosure relates to a display panel device.

BACKGROUND

As tablets become more common in our lives, users have more requirements such as better operation conveniences for the tablets. The tablets can lie on a plane as operated by the users, but the users has to adjust their body postures which may lead to a problem of sore shoulders after long time operations. A tablet may include a stand, behind the panel of the tablet, to form an angle between the panel and the stand to address the problem. As the panel stands on the plane, a better viewing angle can be applied for the observation of the users.

However, the stands of the most tablets need to form a specific angle with the panel to support the weight of the panel, which limits the viewing angles of the users.

SUMMARY

An aspect of the present invention provides a display panel device including a panel, a stand, at least one stand hinge, and at least one foot mechanism. The stand hinge is disposed at a first side of the stand, and the stand hinge is pivotally connecting the panel to the stand. The foot mechanism is disposed at a second side of the stand opposite to the first side. The foot mechanism includes a foot and an elastically pivot assembly. The elastically pivot assembly is pivotally connecting the foot to the stand. When the panel display device is in an opened status, the panel and the stand form a first angle, and one side of the foot lies on a plane. When the panel display device is in a closed status, the stand covers the panel and the foot mechanism is placed within an opening of the panel.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
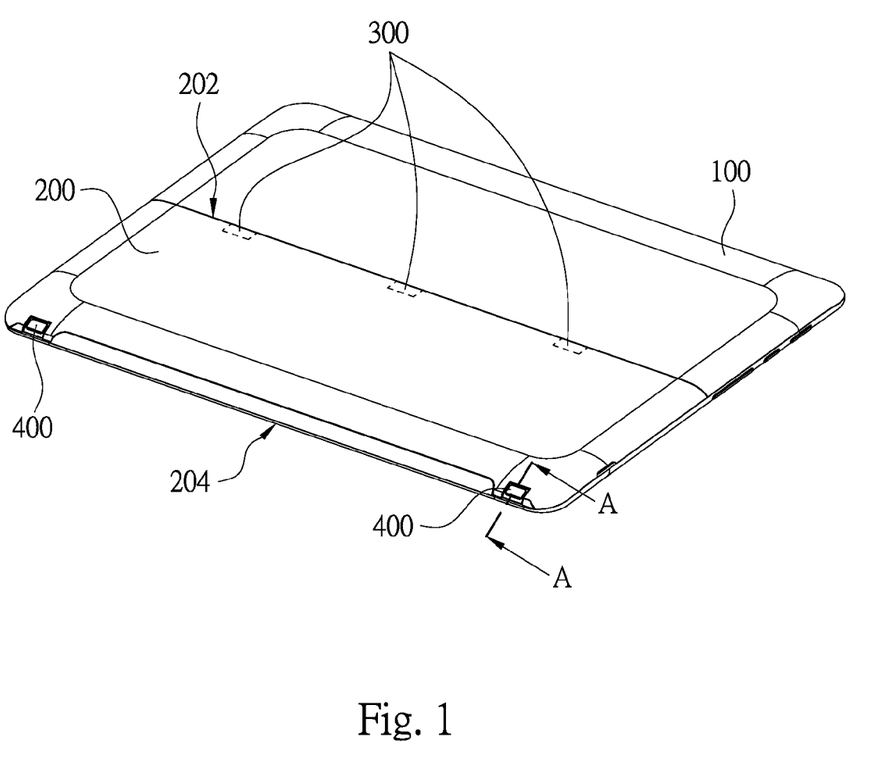
FIG. 1 is a three dimensional view of a display panel device according to one embodiment of the present invention.
Figure 2:
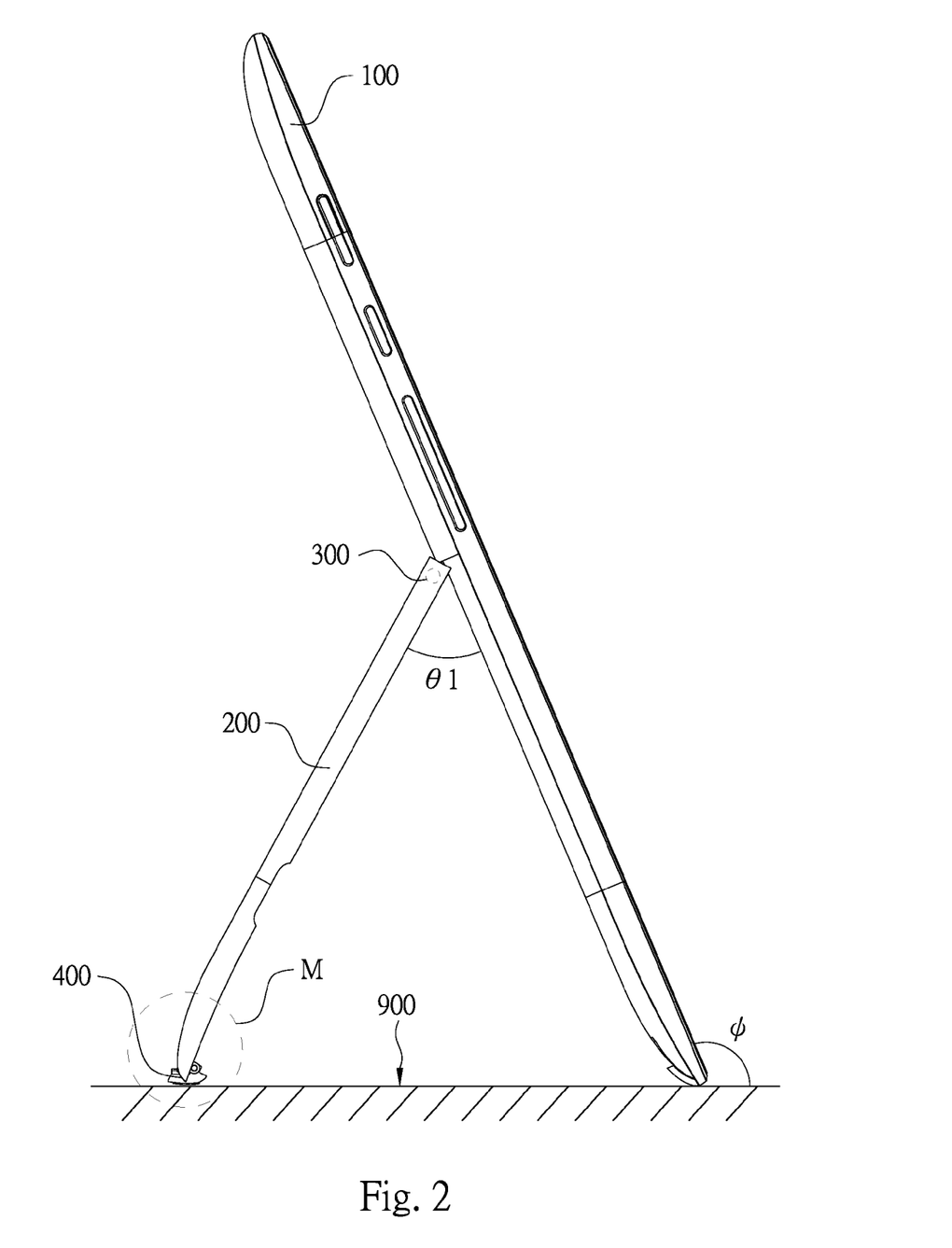
FIG. 2 is a side view of the display panel device of FIG. 1 in an operation status (an opened status)

FIG. 1 is a three dimensional view of a display panel device according to one embodiment of the present invention, and FIG. 2 is a side view of the display panel device of FIG. 1 in an operation status (an opened status). The display panel device includes a panel 100, a stand 200, at least one stand hinge 300, and at least one foot mechanism 400. The stand hinge 300 is disposed at a first side 202 of the stand 200 to pivotally connect the panel 100 to the stand 200. The foot mechanism 400 is disposed at a second side 204 of the stand 200 opposite to the first side 202. When the panel display device stands on the plane 900, a first angle $\theta1$ is formed between the panel 100 and the stand 200, and the foot mechanism 400 is disposed to touch the plane 900. Since the first angle $\theta1$ can be fixed by the frictional forces between the foot mechanism 400 and the plane 900, the stand 200 can be prevented to slide relative to the plane 900. Moreover, although there are two of the foot mechanisms 400 in FIG. 1, the number of the foot mechanism(s) 400 can be one or more than two in other embodiments.

It is noticed that to simplify the descriptions, the stand 200 in FIG. 1 is defined to be in a closed status, i.e., the stand 200 covers the panel 100, and the stand 200 is defined to be in the opened status when the first angle $\theta1$ is not 0 degrees.

Figure 3A:
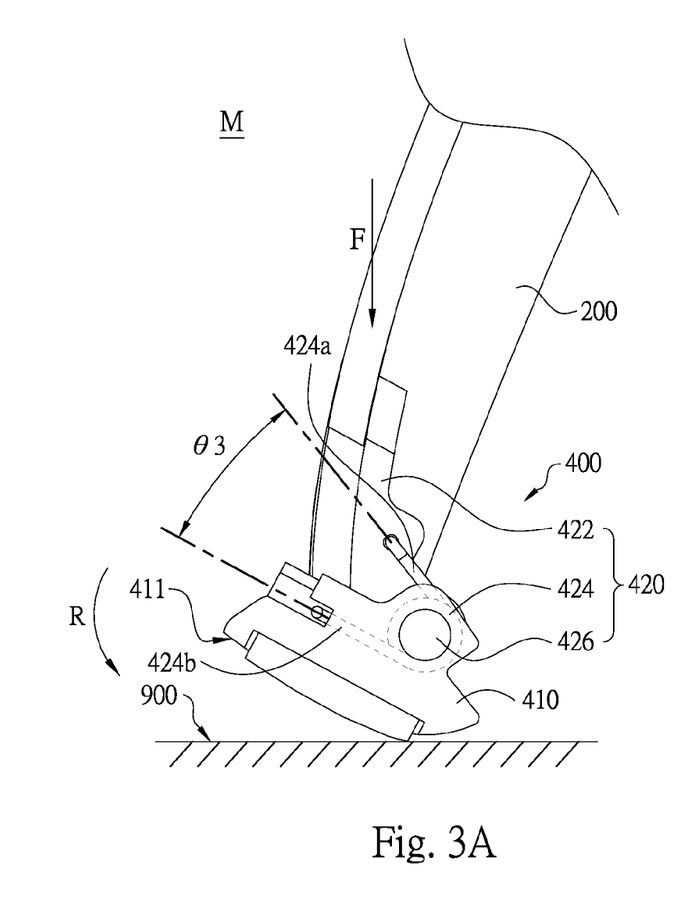
FIG. 3A is a magnified cross-sectional view of an area M of FIG. 2 when the foot mechanism touches the plane.
Figure 4:
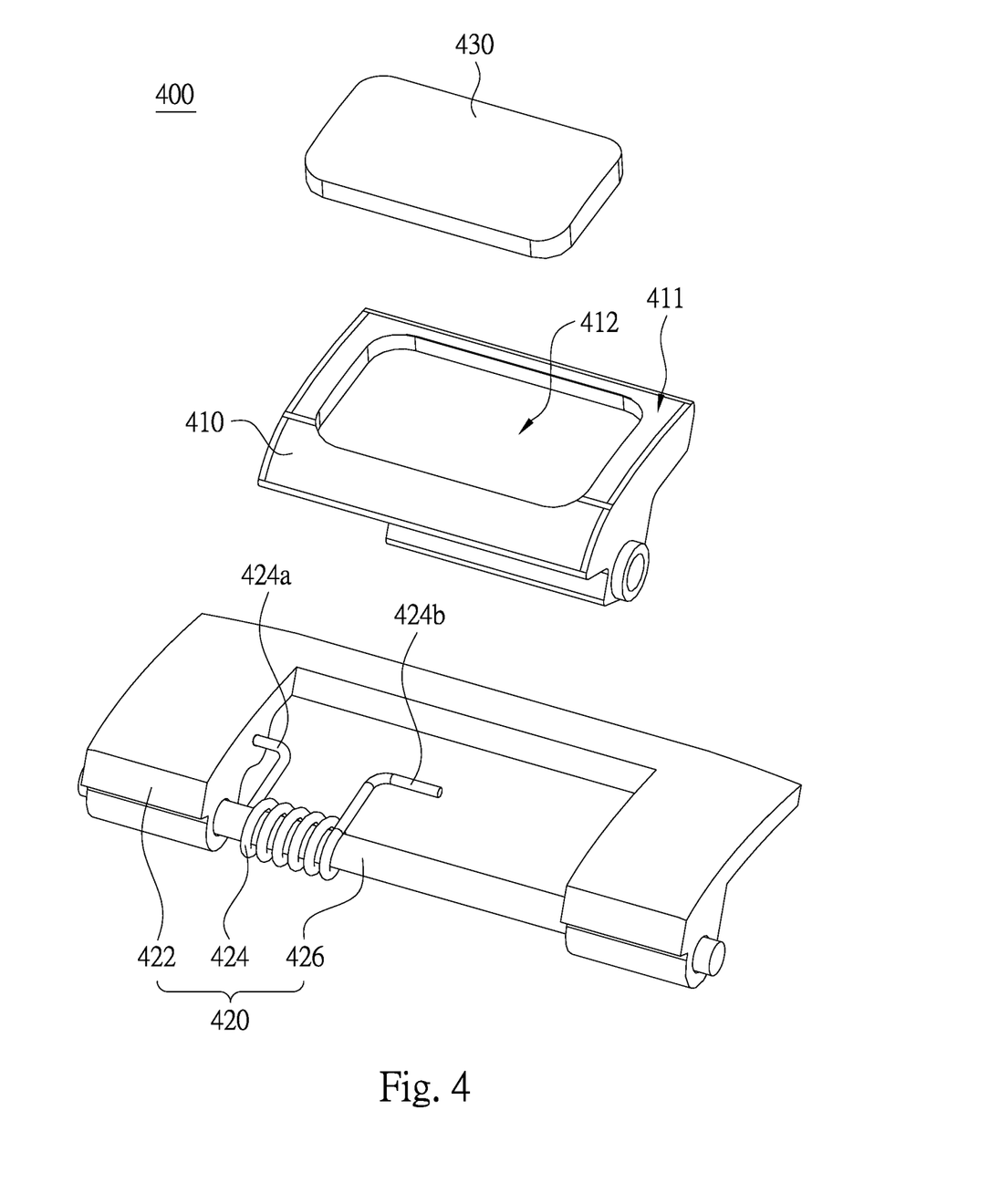
FIG. 4 is an exploded diagram of a foot mechanism of FIG. 2.

FIG. 3A is a magnified cross-sectional view of an area M of FIG. 2 when the foot mechanism 400 touches the plane 900, where the cross-sectional position in FIG. 3A is the same as the position of the line A-A in FIG. 1, and FIG. 4 is an exploded diagram of the foot mechanism 400 of FIG. 2. The foot mechanism 400 includes a foot 410 and an elastically pivot assembly 420. The elastically pivot assembly 420 is pivotally connecting the foot 410 to the stand 200, such that the foot 410 can rotate relative to the stand 200 via the elastically pivot assembly 420.

In this embodiment, the elastically pivot assembly 420 includes a fixing portion 422, a torque spring 424, and a pivot 426. The fixing portion 422 is disposed on the stand 200. The pivot 426 threads the torque spring 424 to be fixed on the fixing portion 422. A first terminal 424a of the torque spring 424 is fixed in the fixing portion 422, and a second terminal 424b of the torque spring 424 is fixed in the foot 410. A third angle $\theta3$ is formed between the first terminal 424a and the second terminal 424b. Therefore, the foot 410 can rotate around the pivot 426 relative to the stand 200 via the torque spring 424.

Reference is made to FIG. 3A. In this embodiment, taking FIG. 2 as an example, the first angle $\theta1$ in FIG. 2 is 51.5 degrees. The torque spring 424 of the elastically pivot assembly 420 is unforced when the foot mechanism 400 does not touch the plane 900, and the third angle $\theta3$ formed between the first terminal 424a and the second terminal 424b is a natural angle, where the natural angle is defined to be an angle between the first terminal 424a and the second terminal 424b of the torque spring 424 when the torque spring 424 is unforced. When the display panel device provides a press force F to the foot mechanism 400 through the stand 200, the foot mechanism 400 begins to touch the plane 900, allowing the foot 410 of the foot mechanism 400 rotating along a counterclockwise direction R around the pivot 426.

Figure 3B:
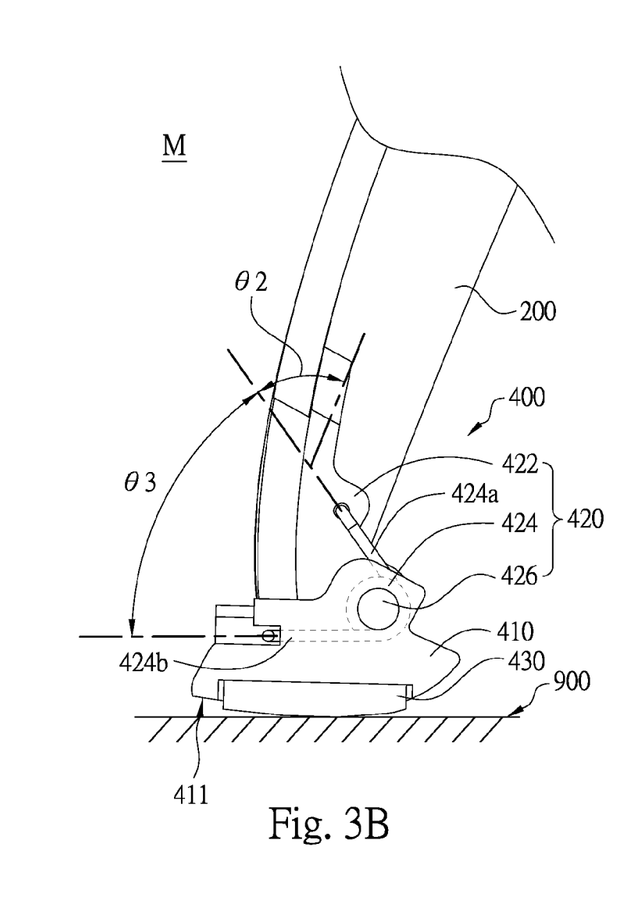
FIG. 3B is a magnified cross-sectional view of the area M of FIG. 2.

FIG. 3B is a magnified cross-sectional view of the area M of FIG. 2, where the cross-sectional position in FIG. 3B is the same as the position of the line A-A in FIG. 1. As described above, when the foot mechanism 400 begins to touch the panel 900, a side 411 of the foot 410 also begins to rotate to abut or lie close to the plane 900, and then the foot 410 stops the foot mechanism 400 rotating as it lies on the plane 900. Therefore, the foot mechanism 400 lies and is fixed on the plane 900, also, the foot mechanism 400 do not slide relative to the plane 900 due to the frictional forces between the side 411 of the foot mechanism 400 and the plane 900. Since the foot mechanism 400 can rotate relative to the stand 200, the foot mechanism 400 can touch the plane 900 with the first angles θ1 (see FIG. 2) as the display panel device stands on the plane 900. The frictional forces between the foot 410 and the plane 900 are generated by the weight the display panel device applies to the foot 410 of the foot mechanism 400. The frictional forces can prevent the foot 410 sliding relative to the plane 900 to fix the first angle θ1.

Moreover, the third angle θ3 between the first terminal 424a and the second terminal 424b of the torque spring 424 is greater than the natural angle of the torque spring 424 when the foot mechanism 400 touches the plane 900. In other words, the torque spring 424 stores a first elastic potential when the foot mechanism 400 touches the plane 900. The first elastic potential would be released when the foot mechanism 400 leaves the plane 900, such that the third angle θ3 returns to the natural angle of the torque spring 424. In other words, the foot 410 does not rotate relative to the stand 200 randomly, which may cause the foot 410 to rotate improperly if it touches the plane 900 at impropriety position, such as a side of the foot 410 facing the torque spring 424.

Moreover, a second angle θ2 with a constant value is formed between the extending direction of the first terminal 424a of the torque spring 424 and the stand 200. The second angle θ2 can also prevent the foot mechanism 400 to touch the plane 900 at impropriety position, leading properly rotation of the foot 410. In one or more embodiments, the second angle θ2 may be 60 degrees. However, the scope of the claimed invention should not be limited in this respect.

Reference is made to FIG. 3B and FIG. 4. In one or more embodiments, the foot mechanism 400 can further include a non-slip portion 430 disposed at a side of the foot 410 opposite to the elastically pivot assembly 420, i.e., the side of the foot 410 touches the plane 900, to increase the frictional forces between the foot mechanism 400 and the plane 900. The non-slip portion 430 may be made of robber. However, the scope of the claimed invention should not be limited in this respect. The frictional forces between the foot mechanism 400 and the plane 900 is increased when the display panel device stands on the plane 900 and the non-slip portion 430 touches the plane 900. In one embodiment, the side 411 of the foot 410 may has a recess 412 to accommodate the non-slip portion 430.

Figure 5A:
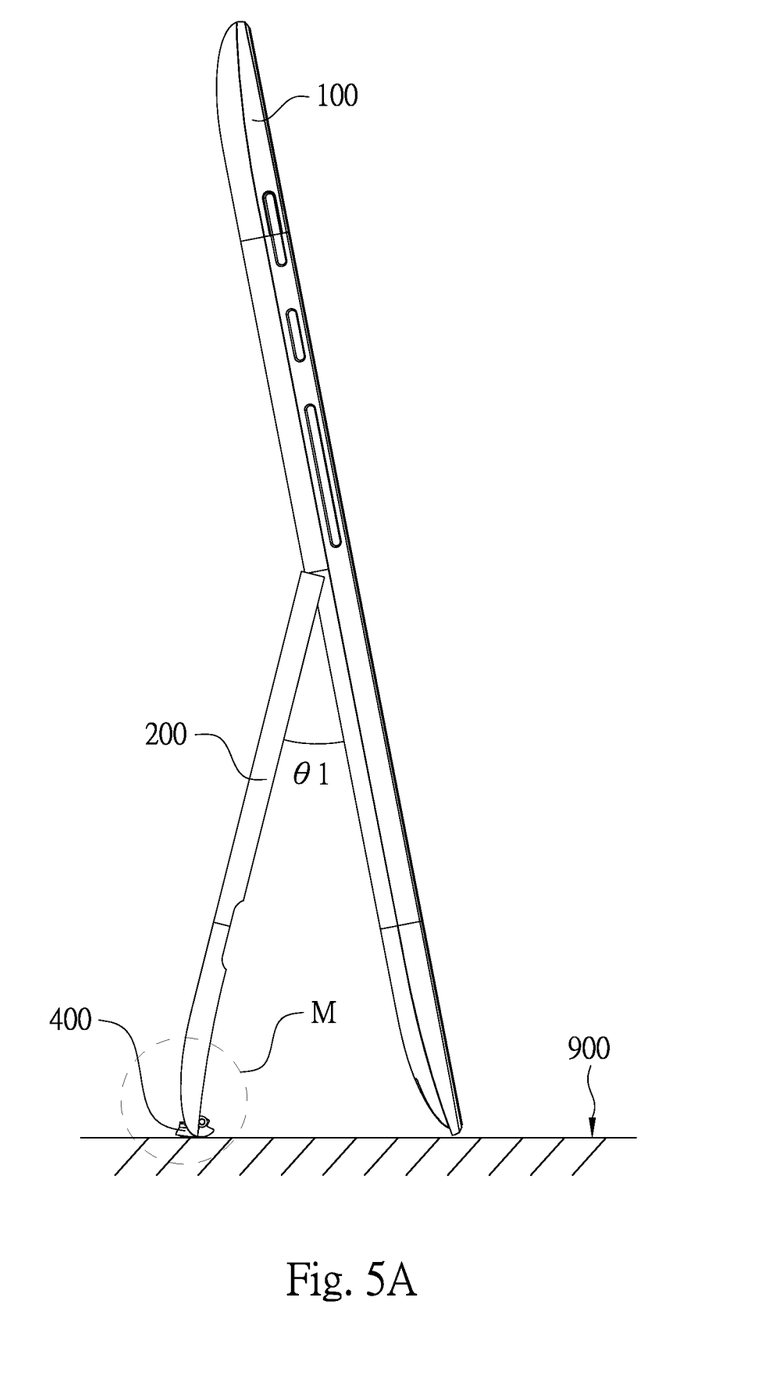
FIG. 5A is a side view of the display panel device of FIG. 2 in another operation status.
Figure 5B:
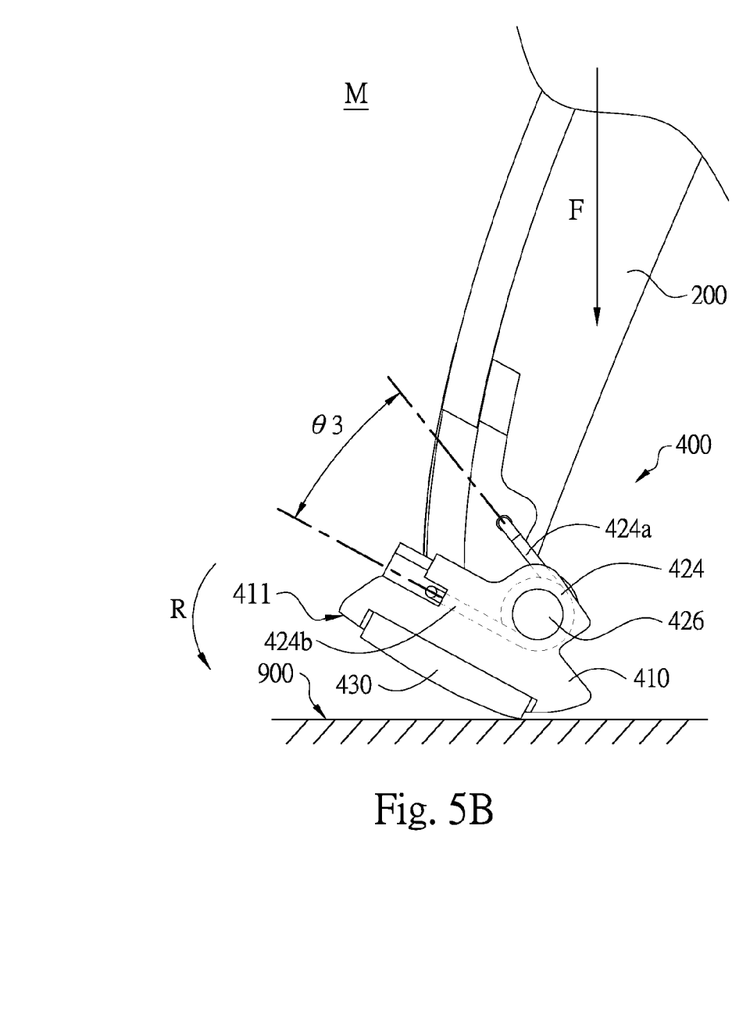
FIG. 5B is a magnified cross-sectional view of an area M of FIG. 5A when the foot mechanism touches the plane.

FIG. 5A is a side view of the display panel device of FIG. 2 in another operation status. In this embodiment, the display panel device can stand on the plane 900 when the first angle θ1 is fixed to 25 degrees while the foot mechanism 400 lies on the plane 900. FIG. 5B is a magnified cross-sectional view of the area M of FIG. 5A when the foot mechanism 400 touches the plane 900, where the cross-sectional position in FIG. 5B is the same as the position of the line A-A in FIG. 1. The third angle θ3 of the first terminal 424a and the second terminal 424b of the torque spring 424 is the natural angle when the foot mechanism 400 of the display panel device does not touch the plane 900. However, when the display panel device applies a press force F to the foot mechanism 400 via the stand 200, the foot mechanism 400 begins to touch the plane 900, such that the foot 410 of the foot mechanism 400 rotates counterclockwise around the pivot 426, leading the non-slip portion 430 disposed on the side 411 of the foot mechanism 400 touches the plane 900.

Figure 5C:
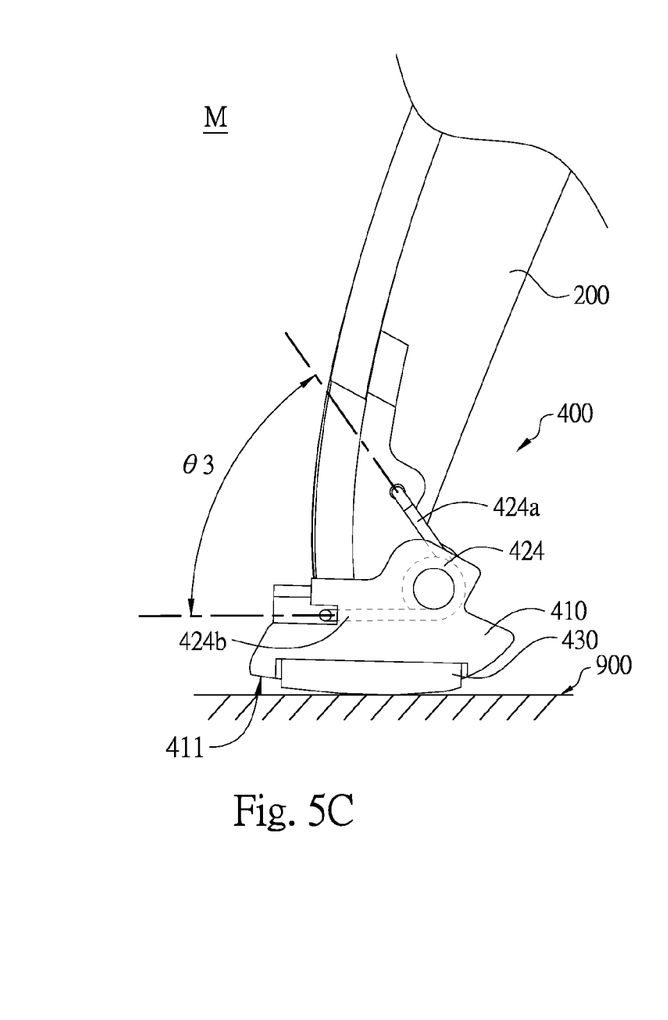
FIG. 5C is a magnified cross-sectional view of the area M of FIG. 5A.

FIG. 5C is a magnified cross-sectional view of the area M of FIG. 5A, where the cross-sectional position in FIG. 5C is the same as the position of the line A-A in FIG. 1. The non-slip portion 430 stops the foot mechanism 400 rotating due to the frictional forces between the non-slip portion 430 and the plane 900 when the side 411 of the foot mechanism 400 lies on the plane 900, such that the foot mechanism 400 can be fixed on the plane 900, and the frictional forces can prevent the rotation of the foot 410 relative to the plane 900.

In summary, the foot 410 of the foot mechanism 400 of the display panel device in this embodiment can rotate relative to the stand 200, such that the foot 410 can lie on the plane 900 when the display panel device stands on the plane 900 with different angle other than the first angles θ1. The frictional forces generated between the foot 410 (or the non-slip portion 430) and the plane 900 can prevent the rotation of the foot 410 relative to the plane 900 to fix the first angle θ1 (i.e. the angle between the panel 100 and the stand 200). Moreover, the third angle θ3 between the first terminal 424a and the second terminal 424b of the torque spring 424 can return to the natural angle of the torque spring 424 when the foot mechanism 400 leaves the plane 900. In other words, the angle between the foot mechanism 400 and the stand 200 is fixed when the foot mechanism 400 leaves the plane 900, such that the foot mechanism 400 can touch the plane 900 with a proper position or portion to reduce the damage of the foot mechanism 400 due to improper forcing when the display panel device is at different first angles θ1 (see FIG. 5A).

Reference is made to FIG. 2. In this embodiment, the stand hinge 300 is substantially at the middle position of the panel 100, such that the stand 200 can support the middle position of the panel 100, and the panel 100 can stand on the plane 900. When the stand hinge 300 is at the middle position of the panel 100, the range of the first angle θ1 can be between 0 degrees to 51.5 degrees. In this case, the observation view ϕ can be between 90 degrees to 135 degrees when the display panel device stands on the plane 900. However, in other embodiments, the first angle θ1 can be in other ranges if the stand hinge 300 is at other positions of the panel 100. The scope of the claimed invention should not be limited in this respect.

Figure 6A:
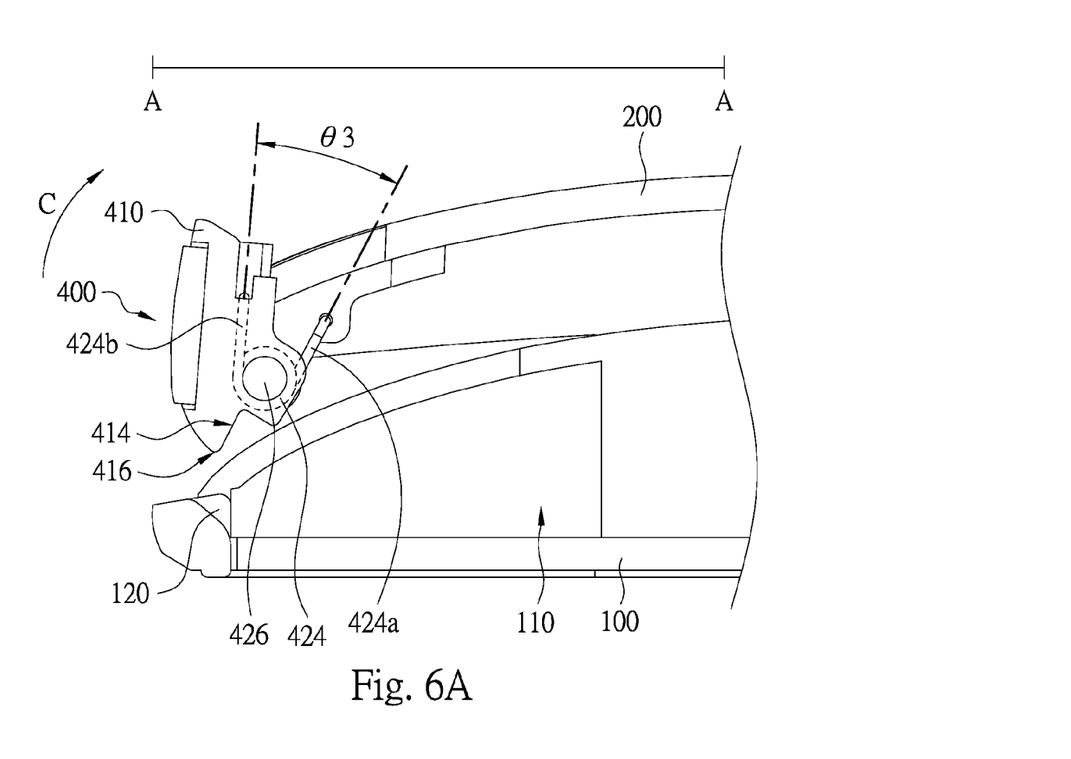
FIG. 6A is a cross-sectional view taken along a line A-A of FIG. 1 when the stand of FIG. 1 is closing.

FIG. 6A is a cross-sectional view taken along the line A-A of FIG. 1 when the stand 200 of FIG. 1 is closing. In this embodiment, the panel 100 has at least one opening 110 which can accommodate the foot mechanism 400 when the stand 200 is in the closed status. Moreover, the panel 100 can include a bump portion 120, and the foot 410 of the foot mechanism 400 can have a recess portion 414. A top portion 416 of the foot 410 can touch the bump portion 120 of the panel 100 first when the stand 200 is closing, and when the stand 200 keeps moving to the panel 100, the bump portion 120 takes the foot 410 via the top portion 416 to rotate the foot 410 around the pivot 426 along a clockwise direction C.

Figure 6B:
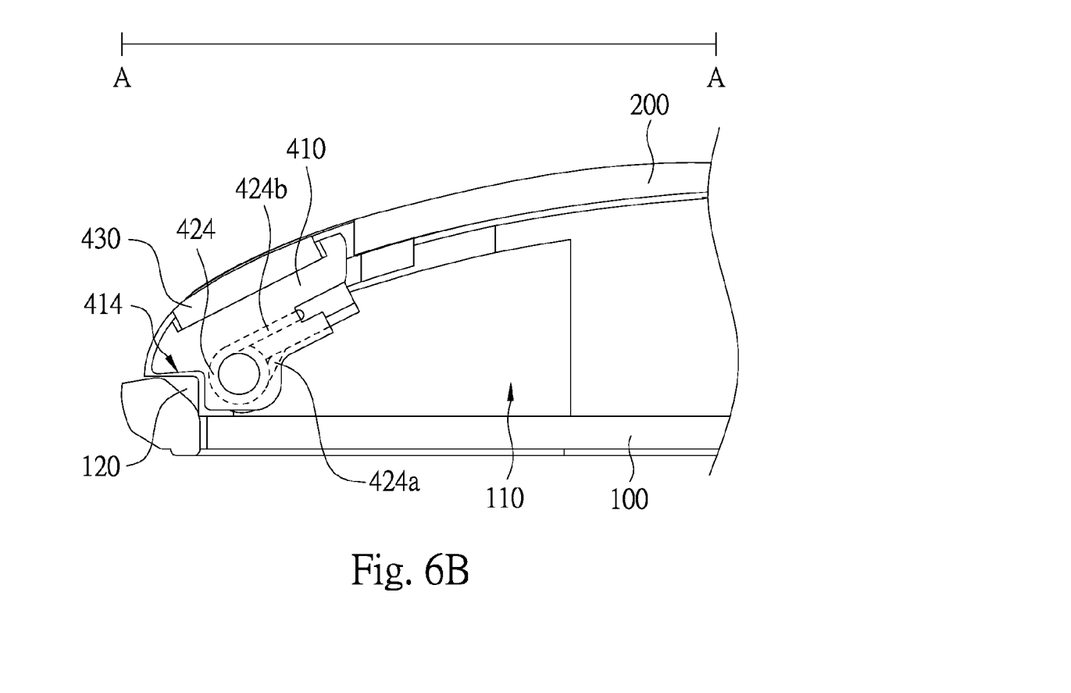
FIG. 6B is a cross-sectional view taken along the line A-A of FIG. 1.

FIG. 6B is a cross-sectional view taken along the line A-A of FIG. 1. Substantially, the bump portion 120 of the panel 100 and the recess portion 414 of the foot 410 are coupled to each other when the foot 410 keeps rotating along the clockwise direction C. The foot 410 then stops rotating as the foot mechanism 400 is disposed in the opening 110 of the panel 100.

In this embodiment, the non-slip portion 430 is substantially parallel to the stand 200 when the foot mechanism 400 is disposed in the opening 110. This configuration prevents the inadvertently touching to the foot mechanism 400, and also beautifies the apparent of the display panel device.

Moreover, the first terminal 424a and the second terminal 424b of the torque spring 424 can be closed to each other when the stand is in the closed status, such that the torque spring 424 can store a second elastic potential which can apply a released force having a direction opposite to that applied to the first elastic potential. This released force is used to return the third angle θ3 (see FIG. 6A) formed between the first terminal 424a and the second terminal 424b to the natural angle of the torque spring 424 when the stand 200 is again in the opened status and the foot mechanism 400 leaves the opening 110.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display panel device, comprising:
   a panel;
   a stand;
   at least one stand hinge disposed at a first side of the stand and pivotally connecting the panel to the stand; and
   at least one foot mechanism disposed at a second side of the stand opposite to the first side, and the foot mechanism comprising:
   a foot; and
   an elastically pivot assembly pivotally connecting the foot to the stand,
   wherein the elastically pivot assembly comprises:
      a fixing portion disposed on the stand;
      a torque spring, wherein a first terminal of the torque spring is fixed on the fixing portion, a second terminal of the torque spring is fixed on the foot, and a natural angle is formed between the first terminal and the second terminal; and
      a pivot threading the torque spring to be fixed on the fixing portion;
   wherein, when the panel display device is in an opened status, the panel and the stand form a first angle, and one side of the foot lies on a plane;
   and when the panel display device is in a closed status, the stand covers the panel and the foot mechanism is placed within an opening of the panel.

2. The display panel device of claim 1, wherein the foot mechanism further comprises a non-slip portion disposed at the side of the foot.

3. The display panel device of claim 2, wherein the non-slip portion is substantially parallel to the stand when the stand covers the panel.

4. The display panel device of claim 1, mechanism when the display panel device switches to the opened status from the closed status, such that the foot of the foot mechanism rotates around the pivot to let the side of the foot lie on the plane, and the torque spring stores a first elastic potential.

5. The display panel device of claim 4, wherein the first elastic potential let an angle formed between the first terminal and the second terminal return to the natural angle when the side of the foot leaves the plane.

6. The display panel device of claim 5, wherein the panel further comprises a bump portion, and the foot of the foot mechanism has a recess portion corresponding to the bump portion.

7. The display panel device of claim 6, wherein a top portion of the foot touches the bump portion of the panel when the display panel device is switched to the closed status from the opened status, such that the foot of the foot mechanism rotates around the pivot to let the bump portion of the panel and the recess portion of the foot couple to each other, and to place the foot mechanism within the opening of the panel.

8. The display panel device of claim 7, wherein the torque spring stores a second elastic potential when the foot mechanism is placed within the opening of the panel.

9. The display panel device of claim 8, wherein the second elastic potential let the angle formed between the first terminal and the second terminal return to the natural angle when the foot mechanism is departed away the opening.

* * * * *